UNITED STATES PATENT OFFICE.

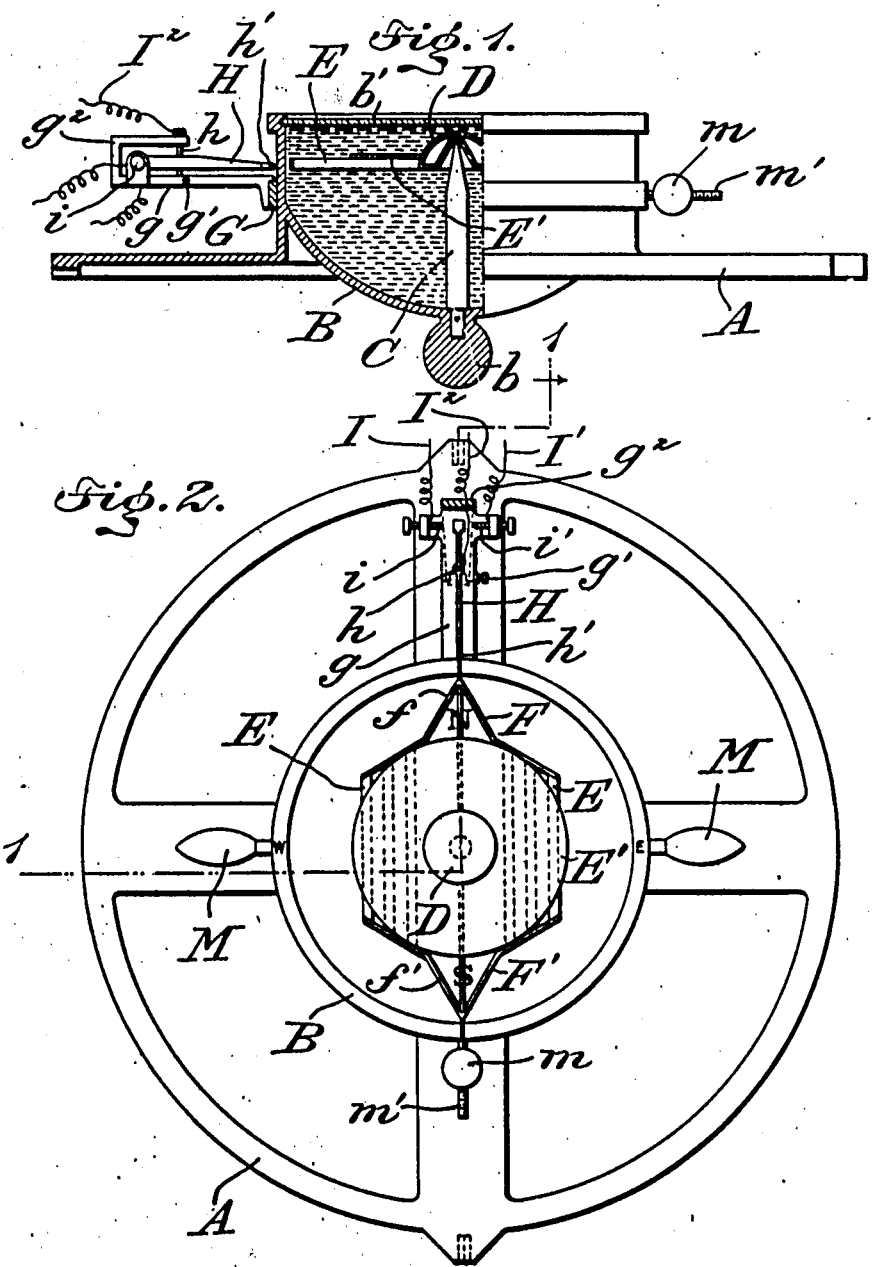

HARRY HERTZBERG, OF BROOKLYN, NEW YORK, ASSIGNOR TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

MARINE COMPASS.

1,022,784.      Specification of Letters Patent.      Patented Apr. 9, 1912.

Original application filed August 14, 1906, Serial No. 330,613. Divided and this application filed May 31, 1907. Serial No. 376,726.

*To all whom it may concern:*

Be it known that I, HARRY HERTZBERG, a citizen of the United States, residing in the city of New York, borough of Brooklyn, in the county of Kings and State of New York, have invented a certain new and useful Marine Compass, of which the following is a specification.

The subject matter of this application is a division of a prior application filed by me on Aug. 14, 1906, Serial No. 330,613, for an invention appertaining to "Steering apparatus for marine vessels, torpedoes, and the like."

The invention is a compass for use in connection with, or as a part of, a system for steering marine vessels, torpedoes, and any or all classes of marine craft.

The object in view is a "dead-beat" compass which will not respond to, or be influenced by, the motion or pitching of the craft, nor oscillate when the craft is changing its course.

More particularly, the compass of this invention is adapted for use in connection with an electrically-operated steering gear or system, the circuit terminals of which are located externally to the compass in order to preclude an electrical current from affecting the liquid present in the compass chamber, whereby disruption of the compass by expansion of the liquid due to the action of an electric current thereon, is obviated.

In the accompanying drawings, I have illustrated one practical embodiment of the invention, but the construction shown therein is to be understood as illustrative only, and not as defining the limits of the invention.

Figure 1 is a vertical section, partly in elevation, illustrating a marine compass of the "Navy standard" pattern embodying my invention, the plane of the section being indicated by the irregular dotted line 1—1 of Fig. 2. Fig. 2 is a plan view of the compass shown in Fig. 1.

A designates one of a pair of plates or rings, the other plate or ring of the pair being mounted by the usual gimbals, whereby the compass is adapted to be manipulated in the usual or any preferred way. Said plate or ring, A, is adapted to rock freely on the aforesaid plate, and said plate, A, carries a compass box or casing, B, of the form shown in the drawings. The casing is provided at its bottom with a counter weight, b, and the upper part of said casing is closed by a transparent cover, b', composed of glass or other suitable material. The casing is adapted to be filled or charged with a suitable liquid, as shown in Fig. 1, and within said casing is a vertical staff, C, the latter being adapted to support a magnetic needle which is movable freely on the staff, the latter being the center of oscillation of said needle. Said magnetic needle is composed of a float, D, appropriate permanent magnets, E, and a dial, E', said magnets, the float and the dial being secured rigidly together and mounted loosely on the staff for rotation freely thereon. The permanent magnets are shown in full and dotted lines in the drawings, and they are arranged in the same horizontal plane, preferably below the dial, E'. It is preferred to provide the float with a central bearing formed by a jewel, and to point the upper end of the fixed staff, C, whereby the float, the magnets and the dial may turn freely on the pointed upper end of the staff.

The float, D, is employed for the purpose of relieving the staff from the weight of the magnets, thus allowing the needle to turn easily and freely on said staff. This float is associated with the dial, E', and with the permanent magnets in such a way that said float forms a part of the magnetic needle. As shown in Fig. 1, the hollow float, D, and the dial, E', constitute practically one element, and the magnets are secured to the underside of the dial, said float being provided with a jewel fitted loosely on the staff, C.

The box or casing, B, is inscribed or provided in any suitable way with the "lubber line," with which is adapted to coöperate the dial, E'. Said dial is provided with a chart which is inscribed to indicate the cardinal points, the steering points and the degrees of a circle, in the manner well understood by those skilled in the art.

An important feature of this invention resides in means for concentrating the magnetism of the respective poles of the permanent magnets, E. One means for accomplishing this purpose are the straps, F, F', which are composed of a piece of soft iron attached to the end portions of said permanent magnets. The straps are bent as at $f, f'$ to form the terminals which are a north magnetic and a south magnetic pole respectively, whereby said straps or bars are converted by the magnetism of the elements, E, into a permanent magnet so that the elements, E, F, F', constitute the magnetic needle of the compass. The ring, G, is fitted loosely around the box or casing, B, the latter being adapted to turn freely within said ring. A supporting arm, $g$, extends outwardly from the ring, G, said arm being jointed as at $g'$ to form an outer foldable or adjustable member, $g^2$. This member supports a vertical pivot, $h$, of a switch bar or arm, H, which is mounted on the arm, $g$, and its member, $g^2$. The switch bar, H, constitutes the controller of an electric circuit by which a helm of a marine craft is adapted to be moved in one direction or the other, substantially as disclosed in the prior application to which reference has been made. Said switch bar or arm is located externally to the casing, B, and to the submerged magnetic needle which is contained within said casing. As shown, the arm, H, occupies a substantially horizontal position above the supporting arm, $g$, and said arm is hung at a point intermediate of its length by the aforesaid pivot, $h$, so that the arm may oscillate freely in a horizontal plane. The externally located switch element has one end arranged quite close to the casing, B, so as to be opposite the north magnetic pole of the needle, and said element is adapted to be influenced by deviations in the position of said magnetic needle. It is preferred to make the switch bar, H, of non-magnetic material, but the end of said bar which lies next to the casing is provided with a soft iron pole piece, $h'$, the latter being under the influence of said magnetic needle, whereby the movement of the needle in one direction or the other will cause the switch bar to be correspondingly shifted for the purpose of closing and opening certain branches of a helm controlling electric circuit. The end of the pivoted switch bar opposite to the soft iron pole piece, $h'$, is arranged to play between the terminals or contacts, $i, i'$, from which lead the conductors, I, I', which conductors form two independent branches of an electric circuit, said circuit having a return conductor I$^2$, which is attached to the pivot, $h$, of the switch arm or bar, H. When the bar, H, is shifted in one direction by the action of the magnetic needle on its pole piece, $h'$, said switch bar will make the contact, $i$, so as to close one branch of the electric circuit through the conductors, I, I$^2$; but when said switch bar is moved in an opposite direction by the attraction of the magnetic needle, the other end of the switch bar makes the contact, $i'$, and thereby closes the other branch of said electric circuit through the conductors, I$^1$ I$^2$. It is desired to state that the switch bar is normally free from engagement with both contacts, $i, i'$, so that the switch bar occupies a neutral position between the aforesaid contacts.

When the course of a vessel is determined upon, the steering apparatus used in connection with the compass herein described operates automatically to guide or direct the vessel in a substantially straight course, but the action of currents and the motion of waves on the craft, changes the course of the vessel in one direction or the other, so that the magnetic needle will dip one way or the other, whereupon the switch bar engages with one of the contacts, as $i$, for closing one branch of electric circuit so as to actuate the steering engine in a way to restore the vessel to its course. Similarly, the deflection of the needle in an opposite direction makes the switch bar, H, engage the other contact, $i'$, for the purpose of closing the other branch of the aforesaid electric circuit and again operate the steering engine, and to shift the helm, thus restoring the vessel on its course. The deviation of the craft from a predetermined course is comparatively slight for the reason that the compass acts to at once operate the steering mechanism automatically so as to move the helm promptly and thereby correct the path of the vessel.

For the purpose of steering the craft by hand, the ring, G, may be shifted around the casing, B, for which purpose said ring is provided with suitable handles, M. Said ring is provided, also, with a counterpoise, $m$, which is made adjustable by screwing it on a threaded stem, $m'$, the latter being fastened to the ring, G. Said counterpoise balances the casing against the weight of the parts contained on the arm, $g$. It is evident that the handle or handles, M, may be manipulated quite easily for turning the ring, G, around the casing, B, and provision is thus made for steering the craft when entering or leaving a harbor or in following a channel. As before stated, however, the vessel is adapted to be steered automatically by the operation of the magnetic needle on the switch arm, H, which in turn opens and closes the respective branches of a helm controlling circuit.

Having thus fully described the invention, what I claim as new, and desire to secure by Letters Patent is:

1. A marine compass having a box or casing adapted to contain a liquid, a magnetic needle mounted within said box, means in coöperative relation to the magnetic needle for augmenting the sensitiveness of said needle and a circuit controller positioned externally of the compass box, said circuit controller being operated by said magnetic needle.

2. A marine compass having a box or casing adapted to contain a liquid, a staff, permanent magnets rotatable on said staff, and soft iron straps in coöperative relation to the poles of said magnets and shaped to produce terminals of opposite polarity.

3. A marine compass having a box or casing adapted to contain a liquid, a staff, permanent magnets rotatable on said staff, soft iron straps in coöperative relation to the poles of said magnet, said straps being so shaped as to produce terminals of opposite polarity, and an external circuit controller composed of a pivoted soft iron switch bar adapted to operate a helm controlling device, said switch bar being operated by said magnets.

In testimony whereof I have signed my name to this specification in the presence of two subscribing witnesses.

HARRY HERTZBERG.

Witnesses:
R. C. R. BINDER,
JOSEPH F. GAIRCE.

Copies of this patent may be obtained for five cents each, by addressing the "Commissioner of Patents. Washington, D. C."